US007925525B2

(12) United States Patent
Chin (10) Patent No.: US 7,925,525 B2
(45) Date of Patent: Apr. 12, 2011

(54) SMART REMINDERS (75) Inventor: Peter G. Chin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 11/089,870

(22) Filed: Mar. 25, 2005

(65) Prior Publication Data

US 2006/0218029 A1    Sep. 28, 2006

(51) Int. Cl.
G06F 9/46    (2006.01)

(52) U.S. Cl. ....... 705/8; 705/7; 705/9; 705/10; 715/751; 701/213; 709/246

(58) Field of Classification Search ................. 705/7–12
See application file for complete search history.

(56) References Cited

U.S. PATENT DOCUMENTS

| | | | |
|---|---|---|---|
| 4,591,840 A * | 5/1986 | Curtis et al. ................. 345/156 |
| 4,819,191 A * | 4/1989 | Scully et al. ................. 715/751 |
| 5,124,912 A * | 6/1992 | Hotaling et al. ................. 705/9 |
| 5,521,589 A * | 5/1996 | Mondrosch et al. ......... 340/7.51 |
| 5,790,974 A * | 8/1998 | Tognazzini ................ 455/456.5 |
| 6,208,996 B1 | 3/2001 | Ben-Shachar et al. ........ 707/104 |
| 6,370,566 B2 | 4/2002 | Discolo et al. ................ 709/206 |
| 6,553,310 B1 * | 4/2003 | Lopke ........................... 701/213 |
| 6,618,716 B1 | 9/2003 | Horvitz ........................... 706/55 |
| 6,678,613 B2 * | 1/2004 | Andrews et al. ............. 701/213 |
| 6,958,692 B1 * | 10/2005 | Ratschunas .............. 340/539.13 |
| 6,988,128 B1 * | 1/2006 | Alexander et al. ........... 709/206 |
| 7,221,937 B2 * | 5/2007 | Lau et al. ...................... 455/419 |
| 7,318,040 B2 * | 1/2008 | Doss et al. ........................ 705/9 |
| 2002/0026572 A1 * | 2/2002 | Joory ............................. 713/100 |
| 2002/0095663 A1 * | 7/2002 | Joory ............................. 717/136 |
| 2002/0116232 A1 * | 8/2002 | Rapp et al. ......................... 705/5 |
| 2002/0116530 A1 | 8/2002 | Burgess ......................... 709/246 |
| 2002/0116541 A1 | 8/2002 | Parker et al. .................. 709/318 |
| 2002/0142792 A1 * | 10/2002 | Martinez ....................... 455/550 |
| 2003/0120737 A1 | 6/2003 | Lytle et al. .................... 709/206 |
| 2003/0131142 A1 * | 7/2003 | Horvitz et al. ................ 709/313 |
| 2003/0225732 A1 | 12/2003 | Chan et al. ......................... 707/1 |
| 2004/0064585 A1 * | 4/2004 | Doss et al. .................... 709/246 |

OTHER PUBLICATIONS

Dey, Anind K.; Abowd, Gregory D.; "CybreMinder: A Context-Aware System for Supporting Reminders" Lecture Notes in Computer Science; vol. 1927 Proceedings of the 2nd international symposium on Handheld and Ubiquitous Computing, Bristol, UK pp. 172-186 Year of Publication: 2000 ISBN:3-540-41093-7.*

(Continued)

Primary Examiner — Lynda C Jasmin
Assistant Examiner — Alan Miller
(74) Attorney, Agent, or Firm — Merchant & Gould (57) ABSTRACT

Systems and methods for scheduling appointment reminders are based on multiple conditions including estimated travel time. An estimate of the time needed to travel between the user's location and the location of the appointment can be determined by retrieving location information from a global address list (GAL), a local address book of a calendaring application, from a map service, or other location determining technology. Users can subscribe to alert service to receive information regarding recent events such as traffic problems, flight delays, weather conditions, etc., which is then used in setting or modifying reminder times. Notifications can be generated for timing conflicts based on the estimated travel time. If the estimated travel time would require the user to leave a previous appointment early, or be late for a subsequent appointment, a notification can be generated to the user.

18 Claims, 6 Drawing Sheets

OTHER PUBLICATIONS (Mosher, Sue; "Outlook Reminders" http://www.windowsitpro.com/print/outlook-2000/outlook-reminders.aspx, Nov. 26, 2002).*

OL2002: Behavior of the 'Appointment Reminder'Check Box; http://support.microsoft.com/kb/301654, Article ID: 301654—Last Review: Apr. 16, 2002—Revision: 1.0.*

* cited by examiner

Mobile Computing Device

SMART REMINDERS

TECHNICAL FIELD

The present invention relates to computer-implemented calendaring systems and, more particularly to controlling or managing reminders in a computer-implemented calendaring system.

BACKGROUND

Small, handheld computing devices have been steadily growing in popularity in recent years. The devices are known by different names, such as palmtops, pocket computers, personal digital assistants, personal organizers, H/PCs, or the like. Additionally, many portable telephone systems, such as cellular phones, incorporate sufficient computing capabilities to fall within the category of the small, handheld computing devices. These devices, hereinafter "mobile computing devices" provide much of the same functionality as their larger counterparts. In particular, mobile computing devices provide many functions to users including word processing, task management, spreadsheet processing, address book functions, Internet browsing, and calendaring, as well as many other functions.

One commonly used feature of mobile computing devices is to configure a mobile computing device to notify the user of an upcoming event (also referred to herein as an "appointment") such as a meeting with a co-worker or a customer, a teleconference, a doctor's appointment, a television show, etc. The mobile computing device will generate a notification to the user at a default (or selectable) time period before the start of the appointment. For example, if a user has a 10:00 AM appointment, the user can enter an appointment in a calendaring application running on a mobile computing device. The mobile computing device will then generate a notification at a preselected time (e.g., fifteen minutes) before 10:00 AM. Typically, notifications may be presented to a user in many different ways. However, the preselected time may not be adequate for some scenarios because it cannot account for other circumstances.

SUMMARY

According to aspects of the present invention, systems and methods for scheduling appointment reminders are provided. In one aspect, an estimate of the time needed to travel between the user's location and the location of the appointment is determined. This travel time estimate is then used to determine a reminder time (i.e., the time at which a reminder notification is provided to the user).

In another aspect, the location of the user and/or appointment is determined by retrieving location information from a global address list (GAL), a local address book of a calendaring application, from a map service (e.g., MapPoint®), or other location determining technology such as global positioning system technology, cell phone location systems, software presence technology (e.g., instant messaging systems that provide presence information such as "available", "offline", "mobile"), etc. In scenarios in which the appointment is set using names (e.g. of the user, conference room, building, etc.), this aspect allows the calendaring application to obtain the location(s) of the user and the appointment locations without having the appointment creator input the locations.

In still another aspect, alerts received by the user are used to modify reminder times. Users can subscribe to alert services such as MSN® Alerts and receive information regarding recent events such as traffic problems, flight delays, weather conditions, etc. This alert information can be used in setting or modifying reminder times.

In yet another aspect, notifications can be generated for timing conflicts based on the estimated travel time. If the estimated travel time would require the user to leave a previous appointment early, or be late for a subsequent appointment, a notification can be generated to the user. The user can then take appropriate action such as requesting a change to one of the appointments.

The invention may be implemented as a computer process, a computing system (not limited to mobile computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF ILLUSTRATED EMBODIMENTS

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
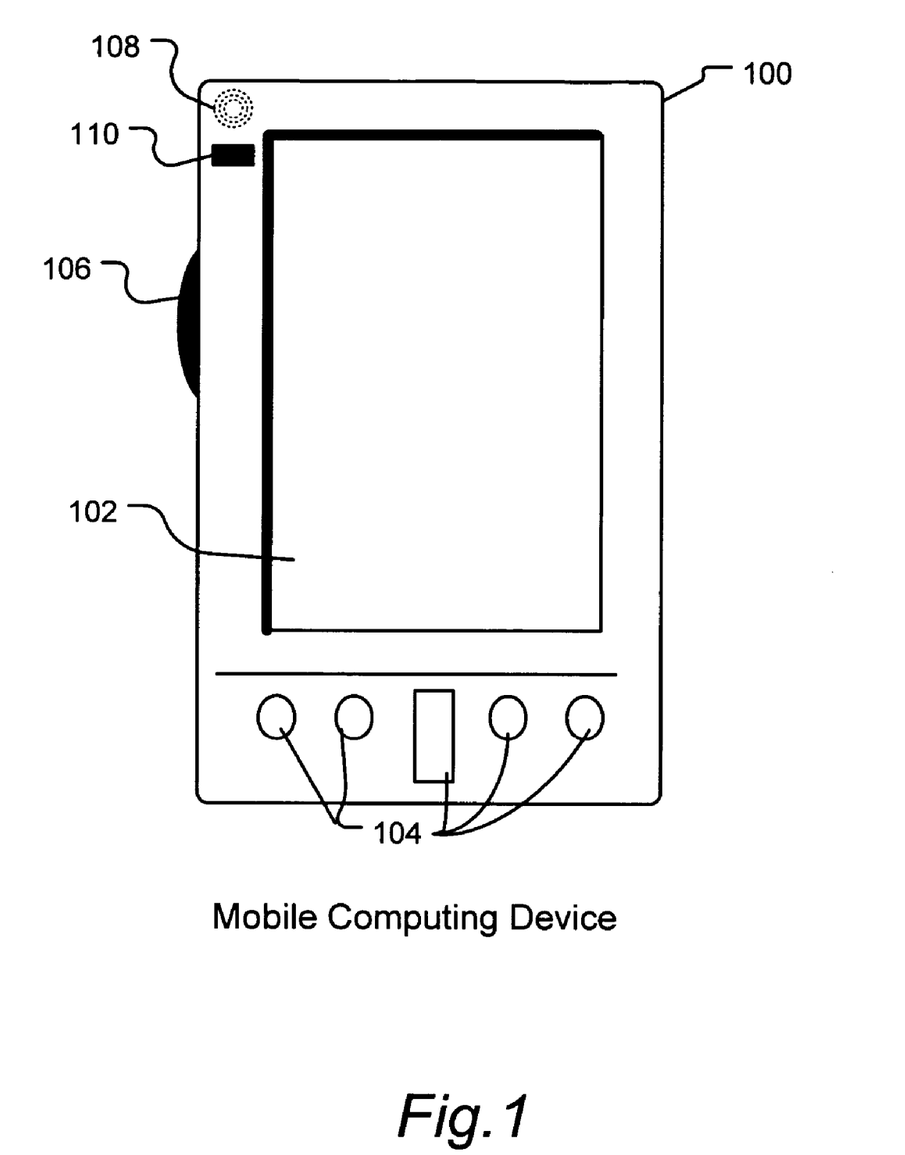
FIG. 1 is a diagram illustrating an exemplary mobile computing device that may be used with a smart reminder system according to an exemplary embodiment of the present invention.

FIG. 1 illustrates a mobile computing device 100 incorporating aspects of the present invention. In this embodiment of the invention, mobile computing device 100 is a handheld computer having both input elements and output elements. Input elements may include touch screen display 102 and input buttons or keypad 104 and allow the user to enter information into mobile computing device 100. Mobile computing device 100 also incorporates a side input element 106 allowing further user input. Side input element 106 may be a rotary switch, a button, or any other type of manual input element. In alternative embodiments, mobile computing device 100 may incorporate more or less input elements. For example, display 102 may not be a touch screen in some embodiments. In yet another alternative embodiment, the mobile computing device is a portable phone system, such as a cellular phone having display 102 and input buttons or keypad 104.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, networks/servers, handheld game devices (e.g., Gameboy® devices) and the like. Embodiments of the invention may also be practiced in distributed computing environments where tasks are performed by remote processing devices that are linked through a communications network in a distributed computing environment, programs may be located in both local and remote memory storage devices. To summarize, any computer system having a plurality of output elements to provide notifications to a user and a plurality of notification event types may incorporate the present invention.

Figure 2:
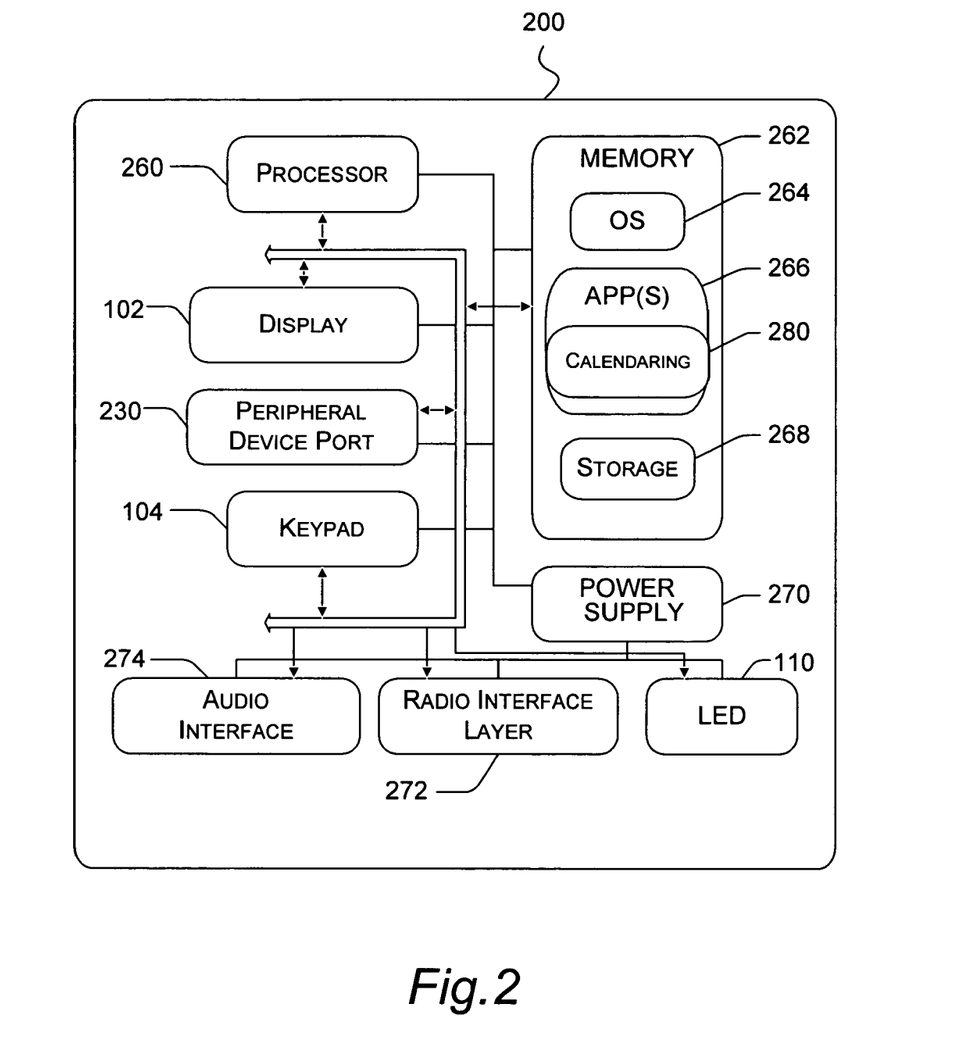
FIG. 2 is a block diagram illustrating components of a mobile computing device used in an embodiment of the present invention, such as the computer shown in FIG. 1.

FIG. 2 illustrates a system 200 used in an embodiment of the present invention, such as the mobile computing device shown in FIG. 1. That is, mobile computing device 100 (FIG. 1) can incorporate system 200 to implement an embodiment of the invention. For example, system 200 can be used in implementing a "smart phone" that can run one or more applications similar to those of a desktop or notebook computer such as, for example, browser, email, scheduling, instant messaging, and media player applications. System 200 can execute an OS such as, for example, Windows XP®, Windows Mobile 2003® or Windows CE®. In some embodiments, system 200 is integrated as a computing device, such as an integrated personal digital assistant (PDA) and wireless phone.

In this embodiment, system 200 has a processor 260, a memory 262, display 102, and keypad 104. Memory 262 generally includes both volatile memory (e.g., RAM) and non-volatile memory (e.g., ROM, Flash Memory, or the like). The system 200 includes an OS 264, which in this embodiment is resident in a flash memory portion of memory 262 and executes on processor 260. Keypad 104 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 266 are loaded into memory 262 and run on operating system 264. Examples of application programs include phone dialer programs, e-mail programs, PIM (personal information management) programs, word processing programs, spreadsheet programs, Internet browser programs, and so forth. In one embodiment, application programs 266 include a calendaring application 280 with smart reminders according to an embodiment of the invention (described below). System 200 also includes non-volatile storage 268 within memory 262. Non-volatile storage 268 may be used to store persistent information that should not be lost if system 200 is powered down. Applications 266 may use and store information in non-volatile storage 268, such as e-mail or other messages used by an e-mail application, contact information used by a PIM, appointment information used by calendaring application 280, documents used by a word processing application, and the like. A synchronization application (not shown) also resides on system 200 and is programmed to interact with a corresponding synchronization application resident on a host computer to keep the information stored in non-volatile storage 268 synchronized with corresponding information stored at the host computer. In some embodiments, non-volatile storage 268 includes the aforementioned flash memory in which the OS (and possibly other software) is stored.

System 200 has a power supply 270, which may be implemented as one or more batteries. Power supply 270 might further include an external power source, such as an AC adapter or a powered docking cradle that supplements or recharges the batteries.

System 200 is also shown with two types of external notification mechanisms: LED 110, and an audio interface 274 that can be used with speaker 108 (FIG. 1) to provide audio notifications. These devices may be directly coupled to power supply 270 so that when activated, they remain on for a duration dictated by the notification mechanism even though processor 260 and other components might shut down to conserve battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation.

System 200 also includes a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 266 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
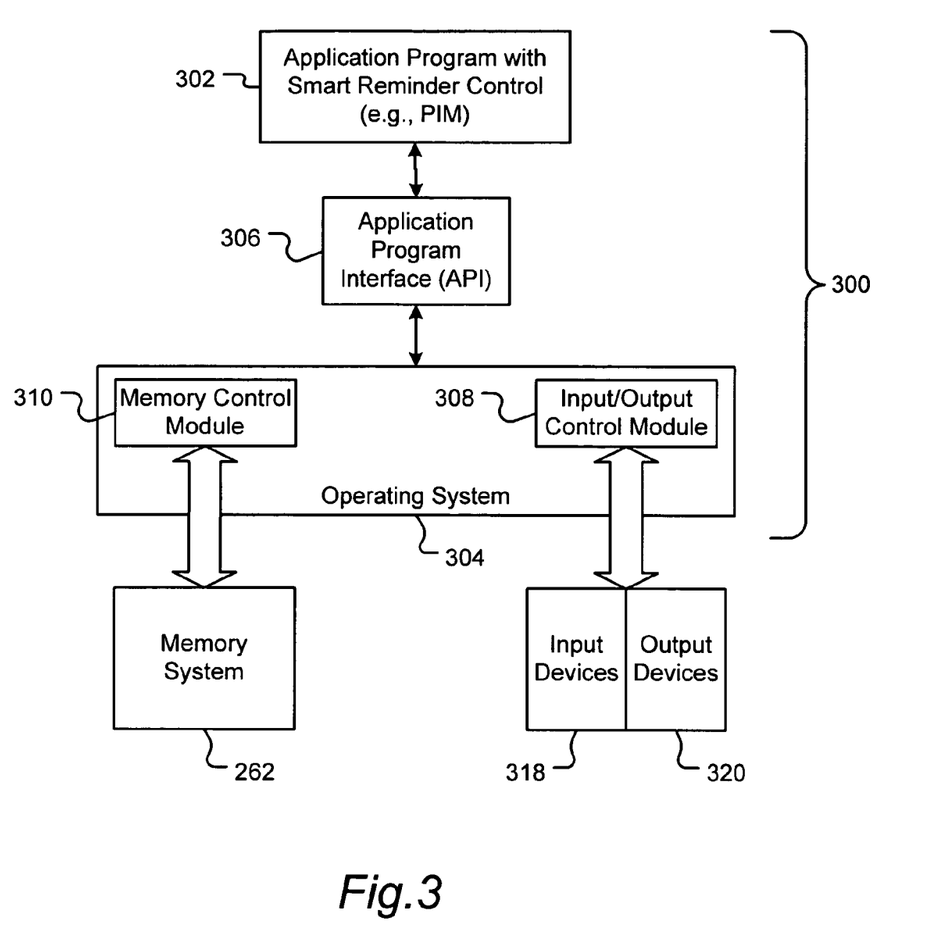
FIG. 3 is a block diagram illustrating a software environment according to an embodiment of the present invention.

FIG. 3 illustrates an exemplary software environment 300 that can be used to implement embodiments of the present invention. In some embodiments, application program 302 has a notification feature to notify a user of an event, and includes a component or module to control the timing of the notifications (i.e., when reminders are triggered). The application program 302 communicates with operating system 304 through an application program interface 306. In one embodiment, the application program interface conforms to the messaging application program interface (MAPI) developed by Microsoft Corp., Redmond, Wash. In alternative embodiments, the application program 302 communicates directly with the OS 304. Although the embodiment shown in FIG. 3 provides application program 302 as the program for controlling reminders, in an alternative embodiment, the reminder control is integrated with OS 304.

Application program 302 communicates with a user through OS 304, input/output control module 308 and input/output devices 308 and 310. Application program 302 receives input signals to customize various notification modes. Each mode has an associated profile and is stored by application program 302 in memory system 262 through OS 304 through a memory control module 310. Additionally, in some embodiments, application program 302 provides a smart reminder feature, which is described below.

Figure 4:
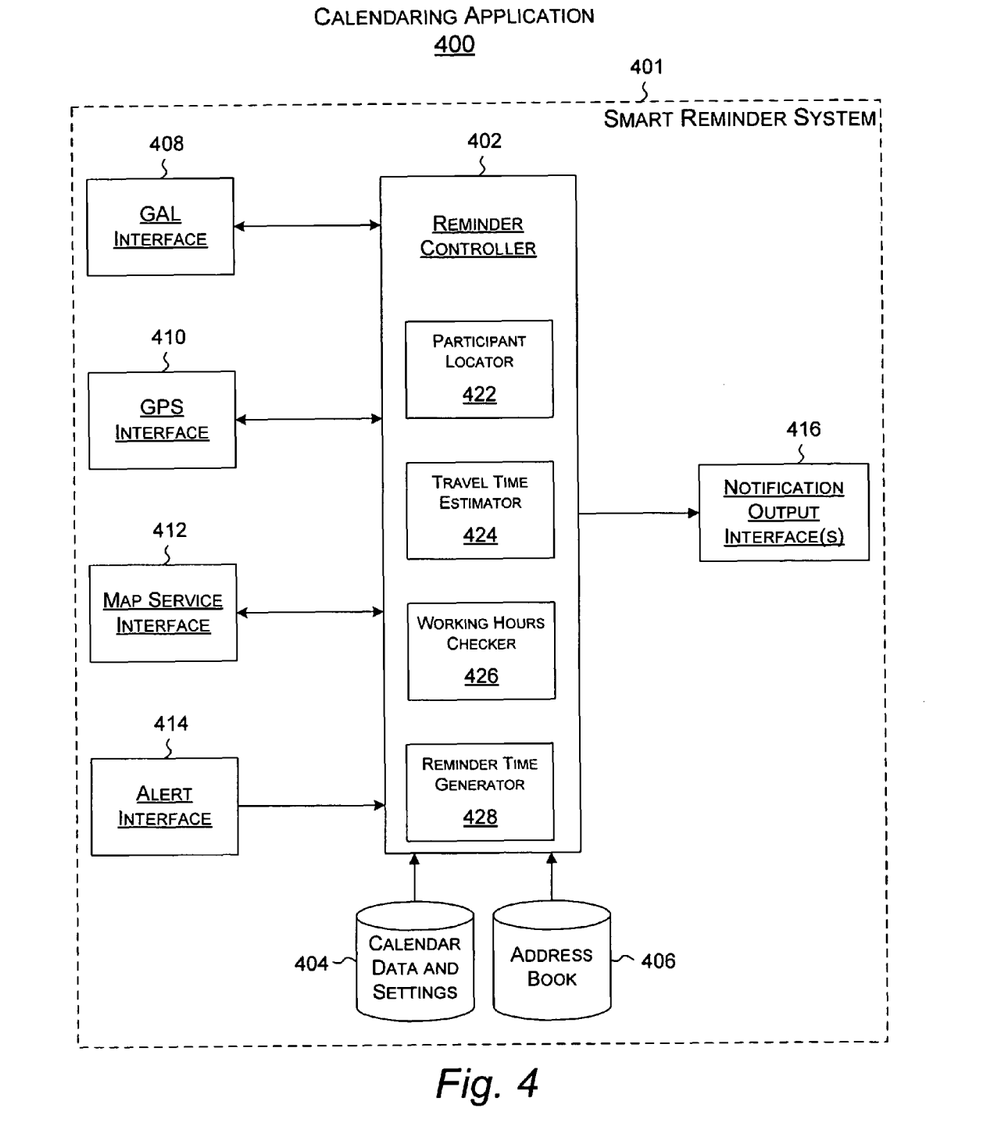
FIG. 4 is a block diagram illustrating components of a smart reminder system, according to one embodiment of the present invention.

FIG. 4 illustrates components of calendaring application 400 that includes a smart reminder system 401, according to one embodiment of the present invention. In one embodiment, calendaring application includes components such as a contacts component, a calendar component, a messaging component, etc. In some embodiments, calendaring application 400 is based on the Microsoft Pocket Outlook® program, available from Microsoft Corp., although in other embodiments smart reminder system 401 may be incorporated into other suitable calendaring applications, including Microsoft Outlook® used in desktop computers.

In this embodiment, smart reminder system 401 includes a reminder controller 402, a data store 404 to store calendaring data and settings, an address book data store 406, a global address list (GAL) interface 408, a global positioning system (GPS) interface 410, a map service interface 412, an alert interface 414 and at least one notification output interface 416. These interfaces can be implemented using calls to methods of an API such as API 306 (FIG. 3). Further, reminder controller 402 includes a participant locator 422, a travel time estimator 424, a working hours checker 426, and a reminder time generator 428. Reminder time generator 428 basically uses information determined or obtained by participant locator 422, travel time estimator 424, and working hours checker 426 to determine a time when the reminder should be triggered (also referred to herein as the "reminder time"). These components are described in more detail below.

In one embodiment, reminder controller 402 examines appointment information stored by calendaring application 400 in data store 404 and creates or updates a reminder for an appointment based on the appointment information. For example, appointment information typically includes the participant(s), the location of the appointment, the date of the appointment, and the time of the appointment. Basically, reminder controller 402 uses this appointment information in determining a reminder time.

In one embodiment, reminder controller 402 can retrieve the location information for the user (presumably one of the participants), and then obtain a travel time estimate for traveling from the user's location to the appointment's location. In this embodiment, for example, participant locator 422 can retrieve a user location using the local address book stored in data store 406 and/or a GAL (e.g., a GAL maintained by an Exchange Server) via GAL interface 408. In some embodiments, participant locator 422 can retrieve the mobile computing device's location (which would generally be the same as the user's location) via GPS interface 410.

Travel time estimator 424 can then retrieve or determine an estimate of the time needed to travel between the user's location and the location of the appointment. For example, travel time estimator 424 can retrieve an estimated travel time from a map service (e.g., MapPoint® available from Internet service provider MSN®). Some map services can provide an estimate of "driving time" of inputted start and destination addresses, so travel time estimator 424 may simply retrieve a travel time estimate in such cases. In other embodiments, travel time estimator 424 may access a map application (e.g., Microsoft® Pocket Streets 2005) that is resident on the mobile computing device and calculate a travel time based on the distance between the user's location and the location of the appointment. Some such mapping applications also determine a route and travel time that can be accessed (e.g., Microsoft AutoRoute™ 2005). For relatively close locations where driving would be impractical (e.g., a campus), travel time estimator 424 can calculate or estimate a time to walk between the locations. Reminder time generator 428 can then set the reminder time to allow for the estimated travel time.

Some calendaring applications (e.g., Microsoft Outlook®) have a feature that stores a user's normal working hours. In embodiments incorporated in such calendaring applications, reminder controller 402 can determine whether the appointment time and/or the reminder time are outside of normal working hours. For example, in this embodiment working hours checker 426 of reminder controller 402 checks whether the appointment date or time fall outside of normal working hours. Then reminder time generator 428 may take appropriate action such as, for example, set the reminder time for the end of the working day just prior to the appointment time. In some embodiments, working hours checker 426 may also determine whether the appointment falls on a holiday or other special event that otherwise would be within normal working hours.

In accordance with other embodiments, smart reminder system 401 may incorporate additional sources of information in determining the reminder time. For example, the user may have subscribed to an alert service (e.g., MSN® Alerts) that sends an e-mail and/or instant messaging (IM) message to the subscriber alerting the subscriber that an event has occurred. The user typically subscribes to receive one or more types of alerts (e.g. traffic reports, weather reports, public transit status, etc.). Some embodiments of smart reminder system 401 allow reminder controller 402 to also receive such alert information via alert interface 414. Reminder time generator 428 can then adjust the reminder time in response to any alerts received from the alert service. For example, if a normal driving route is blocked because of an accident, then in response to an alert of this accident, reminder time generator 428 can suggest an alternative route, recalculate the estimated travel time, and appropriately adjust when the notification/reminder is displayed. In some embodiments, the user may configure smart reminder system 401 to add a specified amount of time to the "lead-time" of the reminder when the alert is received within a specified time before the appointment starts.

When the reminder time is reached, reminder controller 402 can then trigger the reminder notification via notification output interface(s) 416. As previously described, the reminder notification can be an audio and/or visual and/or vibration signal.

Although the above-described embodiment has been described in terms of separate modules or components, in other embodiments the functions of the various modules or components may be performed by other modules and/or combined into fewer modules. In still other embodiments, some of the functions performed by the described modules may be separated further into more modules.

A scenario is described below to illustrate some of the features of smart reminder system 401. In this scenario, Carlos receives a meeting request that is set for 8:00 AM the next morning. Carlos usually doesn't come into work that early. The appointment also will require some travel time from Carlos' office.

Carlos accepts the appointment and it gets added to his Calendar. Smart reminder system 401 determines that the meeting is not near his office by referencing the meeting location included in the meeting request with the GAL information of where Carlos's office is located.

In this scenario, smart reminder system 401 has determined that the meeting location is in a building a short distance away from Carlos's office, and further estimates the travel time at five minutes. Since a five minute travel time is required, smart reminder system 401 configures the reminder to trigger five minutes earlier than a default fifteen minute reminder time that Carlos has previously set in calendaring application 400. Thus, smart reminder system 401 sets the reminder time for 7:40 AM (i.e., twenty minutes before the meeting time).

Carlos finishes his day and goes home as usual a few minutes after 6:00 PM. Carlos had previously configured his working hours to 9:00 AM to 6:00 PM in calendaring application 400. At 6:00 PM, smart reminder system 401 triggers a reminder that Carlos has an 8:00 AM meeting in the morning. Smart reminder system 401 has triggered this additional early reminder at the end of the working hours because the meeting is scheduled outside of his normal working hours for tomorrow.

The next morning, smart reminder system 401 receives a traffic alert that Carlos's typical travel route will have delays. Smart reminder system 401 triggers an additional reminder for this meeting even earlier than the twenty minute meeting reminder in case he needs to leave earlier or find a different route getting to the meeting on time. In this scenario, Carlos has previously configured smart reminder system 401 to add an extra half hour lead-time to the reminder time when a traffic alert is received when an appointment time is one hour away and requires travel. Thus, in the scenario, smart reminder system 401 causes Carlos to receive a reminder at 7:10 AM.

Figure 5:
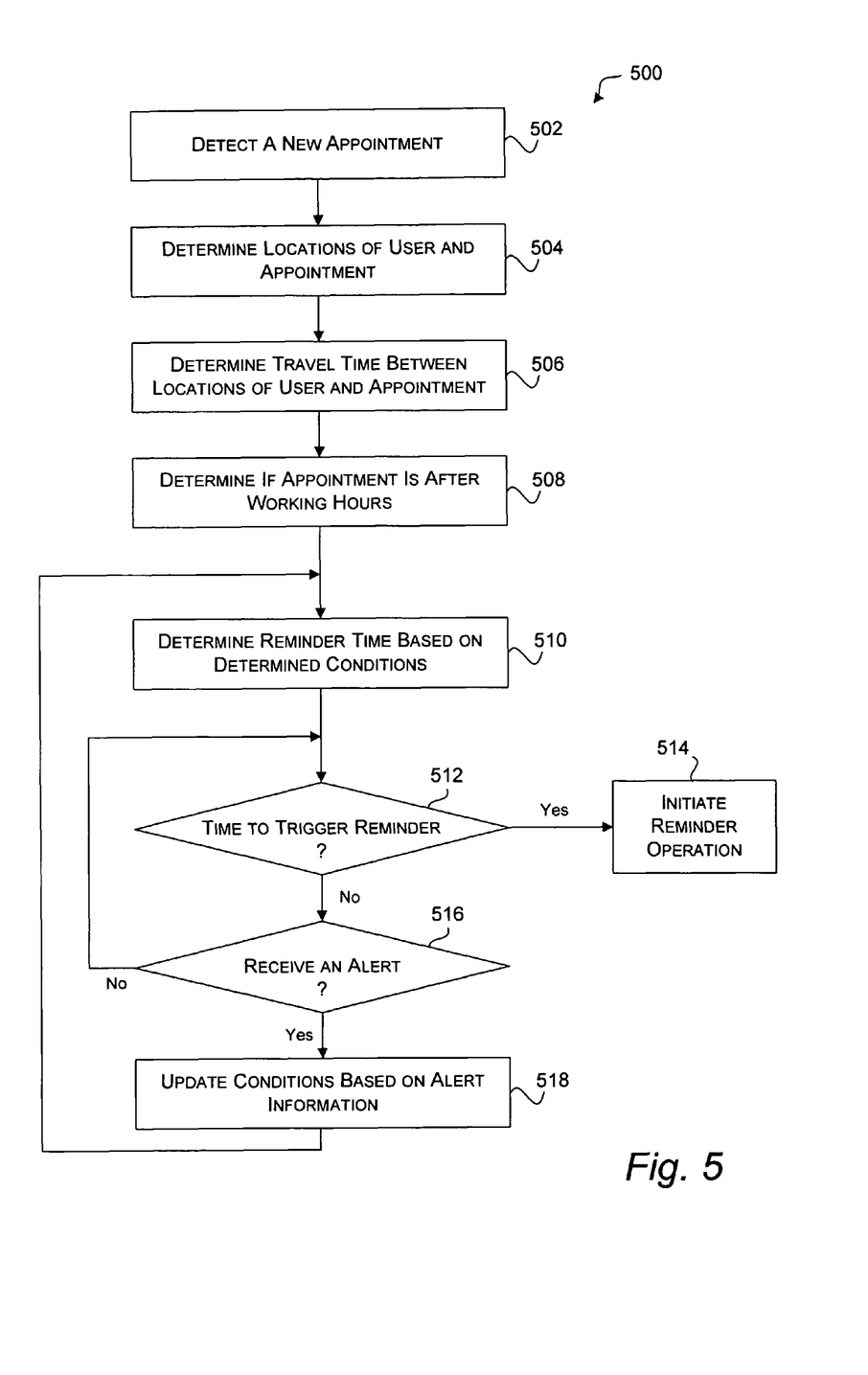
FIG. 5 is a flow diagram illustrating operational flow of a smart reminder system, according to one embodiment of the present invention.

FIG. 5 illustrates operational flow 500 in generating reminders in a calendaring application, according to one embodiment of the present invention. Operational flow 500 may be performed in any suitable computing environment. For example, operational flow 500 may be executed by system 200 (FIG. 2) to implement smart reminder system 401 (FIG. 4). Therefore, the description of operational flow 500 may refer to at least one of the components of FIGS. 2 and 4. However, any such reference to components of FIGS. 2 and 4 is for descriptive purposes only, and it is to be understood that the implementations of FIGS. 2 and 4 are a non-limiting environment for operational flow 500.

At a block 502, a new appointment to be entered into a calendaring application is detected. Typically, this operation is performed by a component of the calendaring application. In one embodiment, a reminder system such as, for example, smart reminder system 401 (FIG. 4) detects the new appointment.

Figure 6:
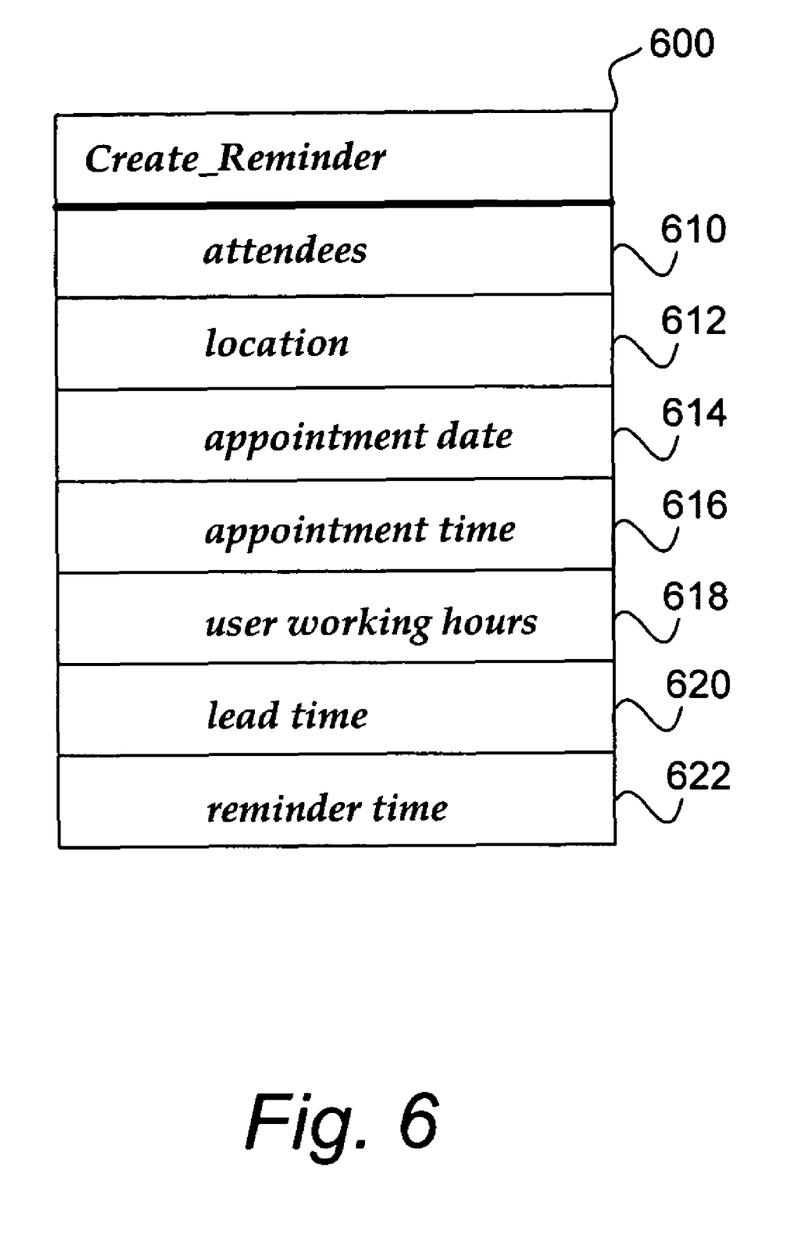
FIG. 6 is a diagram illustrating a data structure used to store data related to a smart reminder system, according to one embodiment of the present invention.

In one embodiment, the reminder system maintains a data structure to store information related to the reminder. For example, the reminder system may use data structure 600 illustrated in FIG. 6. In the illustrated embodiment, data structure 600 includes:

(a) one or more fields 610 for storing attendees of the appointment;

(b) one or more fields 612 for storing locations of the appointment and the user and possibly other attendees;

(c) at least one field 614 for storing the appointment date;

(d) at least one field 616 for storing the appointment time, including start and end times of the appointment;

(e) at least one field 618 for storing the user's working hours;

(f) at least one field 620 for storing a lead time; and (g) at least one field 622 for storing the reminder time.

The lead-time of field 620 may be a default lead-time or set by the user. For example, a user may want the reminder time to include a ten-minute lead-time so that the user can wrap-up the work the user is currently engaged in, and gather materials for the appointment, etc. This lead-time could be in addition to any travel time needed to get to the appointment.

At a block 504, the locations of a user and the appointment are determined. In one embodiment, a component of a reminder system (such as, for example, participant locator 422 of FIG. 4) determines the locations of both the user and where the appointment is to take place. For example, the locations can be determined by accessing one or more data stores maintained by typical calendaring operations, a local map application, a GAL (e.g., via a server), a GPS service, or other suitable location information source (e.g., cell phone location systems, software presence systems of other running applications such as instant messaging systems, etc.).

At a block 506, the travel time between the user and appointment locations is determined. In one embodiment, a component of a reminder system (such as, for example, travel time estimator 424 of FIG. 4) determines or estimates the travel time between the locations. For example, the travel time estimate can be obtained from a map service (e.g., Map-Point®), or determined based on the distance between the user's location and the location of the appointment. This distance can be determined from map applications, on-line mapping services, or other suitable location information sources. Some embodiments determine whether the user will likely walk to the appointment (e.g., if the appointment is within a preselected distance from the user's location) or drive to the appointment, and then make the travel time estimate accordingly.

At a block 508, it is determined whether the appointment time is within the user's working hours. In one embodiment, a component of a reminder system (such as, for example, working hours checker 426 of FIG. 4) obtains the working hours and appointment date and time from a data store. The working hours and appointment date and time may be stored in a data structure such as data structure 600. In some embodiments, this component can also be used after the reminder time is determined to check whether the reminder would be triggered outside of working hours. As will be described below, reminder times for appointments (and reminders in some embodiments) that start outside of working hours can be generated so that the reminders are triggered at the end of the working hours immediately prior to the appointment.

At a block 510, the reminder time is determined based at least in part on one or more conditions as determined in blocks 504, 506 and 508. In one embodiment, a reminder system (such as, for example, reminder system 401 of FIG. 4) of the calendaring application determines a reminder time for the appointment based on the lead-time (e.g., see field 620 of data structure 600 in FIG. 6), the travel time as estimated at block 506, and whether the appointment start time is outside of the working hours as determined at block 508. For example, if the lead-time is ten minutes, the estimated travel time is twenty-five minutes and the appointment date and start time are within working hours, the reminder system would generate a reminder time that is thirty-five minutes before the appointment time. In another example, if the appointment date and start time are outside of working hours, the reminder system may generate the reminder with a reminder time set at the end of working hours immediately prior to the appointment time. In this example, if the appointment were set to start on Tuesday morning at 8:00 AM and the user's working hours were 9:00 AM to 6:00 PM, then this additional reminder would have a reminder time of 6:00 PM on Monday. In some embodiments, this reminder would be in addition to the reminder set for thirty-five minutes before the appointment time. In one embodiment, the reminder system stores the determined reminder time in a data store (e.g., see field 622 of data structure 600 of FIG. 6).

At a block 512, it is determined whether the reminder time has been reached (i.e., is it time to trigger the reminder?). In one embodiment, a reminder system (such as, for example, reminder system 401 of FIG. 4) of the calendaring application monitors the current time and when it reaches the reminder time, triggers the reminder at a block 514. In this embodiment, the reminder operation is a standard reminder as can be generated by currently available calendaring applications. However, if at block 512, the reminder time has not been reached, operational flow proceeds to a block 516.

At block 516, it is determined whether an alert has been received. In one embodiment, a reminder system (such as, for example, reminder system 401 of FIG. 4) of the calendaring application detects when alerts from an alert service such as MSN® Alerts are received. As previously described, a user may subscribe to receive alerts (such as traffic alerts for a selected travel route) from a service via email or IM message. In this embodiment, the reminder system can detect such alerts and, in response, appropriately modify the reminder time at a block 518. For example, if a traffic alert is received indicating that traffic is delayed, the reminder system can appropriately increase the travel time. The increase can be based on a default time, a time set by the user, or a delay time provided by the alert service (if available). In this embodiment, operational flow loops back to block 510 so that the reminder time can be re-determined based on the newly determined travel time. However, if at block 516 no alert is received, operational flow loops back to block 512 to determine whether the reminder time has been reached.

Although the above operational flow is described sequentially, in other embodiments some operations may be performed in different orders or concurrently.

In a further refinement, the reminder system may determine if the travel time causes a conflict with other appointments the user may have either before or after this particular appointment. For example, if the travel time would require the user to leave for the appointment at 10:00 AM for a 10:30 AM appointment, and the user has an appointment that ends at 10:15 AM, the reminder system may notify the user of the timing conflict. Similarly, if the appointment ends at 11:00 AM and the user has another appointment at 11:15 AM at the user's office, the reminder system can detect that the thirty-minute travel time back to the user's office from the 11:00 AM appointment will cause a conflict and notify the user.

Although the invention has been described in language specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method of reminding a user of an appointment, the method executing on a processor on a computing device, comprising:

determining, by the processor, a location associated with the user;

determining, by the processor, a location associated with the appointment;

determining, by the processor, a travel time between the locations associated with the user and appointment;

determining, by the processor, a first reminder time based at least in part on the travel time; working hours of the user; and an appointment time of the appointment;

in response to determining, by the processor, that the appointment time is outside of the user's working hours, automatically determining a second reminder time that is an additional reminder to the first reminder; wherein the second reminder time is not automatically determined when the appointment time is within the user's working hours; and     issuing, by the processor, a first reminder to the user at the first reminder time and issuing a second reminder at the second reminder time.

2. The method of claim 1 further comprising setting the first reminder time to be during the user's working hours previous to the appointment time when the appointment start time is outside of the user's working hours.

3. The method of claim 1 further comprising setting the first reminder time to be during the user's working hours previous to the appointment time when the determined first reminder time would otherwise be outside of the user's working hours.

4. The method of claim 1 further comprising modifying the first reminder time in response to information contained in an alert provided by an alerting service; wherein additional time is preset based on a type of alert received.

5. The method of claim 1 wherein determining a location associated with the user further comprises accessing a global address list (GAL).

6. The method of claim 1 wherein determining a location associated with the user further comprises using a global positioning system (GPS).

7. The method of claim 1 wherein determining a location associated with the user further comprises accessing information from a source of map information.

8. The method of claim 1 wherein determining the first reminder time further comprises determining the first reminder time using a predetermined lead-time in addition to the travel time.

9. The method of claim 1 further comprising causing a notification to be issued in response to a determination that the travel time would cause a conflict with another appointment; wherein the another appointment can be located in time either before or after the appointment.

10. A system to determine a time to send a reminder for an appointment, the system comprising:
- a processor;
- a participant locator using the processor in determining locations of a user and an appointment;
- a travel time estimator using the processor in determining an estimate of time needed to travel from the determined user location to the determined appointment location;
- a reminder time generator using the processor in determining a first reminder time at which a reminder notification is to be issued based on the estimated travel time and working hours of the user; and when the first reminder time for the reminder is outside of the working hours of the user: automatically adjusting the first reminder time to a time during a previous day and automatically creating a second reminder time that is issued in addition to the first reminder for the appointment.

11. The system of claim 10 further comprising an interface to a global address list (GAL) through which participant locator can access location information.

12. The system of claim 10 further comprising an interface to a global positioning system (GPS) through which participant locator can access location information.

13. The system of claim 10 further comprising an interface to a map service through which participant locator can access location information.

14. The system of claim 10 further comprising an interface to an alert service through which the reminder time generator can receive alert information that can affect the reminder time.

15. The system of claim 10 further comprising a working hours checker to determine whether the appointment starts within the user's working normal hours.

16. A system for generate a reminder for an appointment, the system comprising:
- means for utilizing a processor in determining locations of a user and an appointment;
- means for utilizing the processor in estimating a time needed to travel from the determined user location to the determined appointment location;
- means for utilizing the processor in determining a first reminder time at which a reminder notification is to be issued based on an appointment time, the estimated travel time and working hours of the user;
- means for utilizing the processor in automatically determining a second reminder time for the appointment in response to determining that the appointment time is outside of the user's working hours; wherein the second reminder time is not determined when the appointment time is within the user's working hours; and
- means for utilizing the processor in notifying the user of the appointment at the first reminder time.

17. The system of claim 16 wherein the means for determining locations comprises means for accessing location information from one or more of a global address list (GAL), a global positioning system (GPS), a map service, a local map application, or a local address book.

18. The system of claim 16 means for setting the first reminder time to be during the user's working hours prior to the appointment if the appointment starts outside of the user's working hours.

\* \* \* \* \*